United States Patent [19]
Smith et al.

[11] Patent Number: 5,490,089
[45] Date of Patent: Feb. 6, 1996

[54] INTERACTIVE USER SUPPORT SYSTEM AND METHOD USING SENSORS AND MACHINE KNOWLEDGE

[75] Inventors: Craig A. Smith, Pittsford, N.Y.; Robert L. Kurtz, Salem, S.C.; Mark A. Byers; Thomas B. Wall, both of Fairport, N.Y.

[73] Assignee: Xerox Corporation, Stamford, Conn.

[21] Appl. No.: 434,307

[22] Filed: May 2, 1995

Related U.S. Application Data

[63] Continuation of Ser. No. 76,673, Jun. 15, 1993, abandoned.

[51] Int. Cl.⁶ .............................. B41L 19/00; G06F 17/00
[52] U.S. Cl. ..................... 364/514 R; 364/188; 355/209; 355/204; 395/183.13
[58] Field of Search ..................................... 355/203, 204, 355/205, 207, 209; 364/188; 359/110; 340/517, 523, 825.06, 825.16; 324/511, 512, 515; 371/29.1

[56] References Cited

U.S. PATENT DOCUMENTS

| | | |
|---|---|---|
| 4,149,091 | 4/1979 | Crean et al. . |
| 4,186,299 | 1/1980 | Batchelor . |
| 4,463,363 | 7/1984 | Gundlach et al. . |
| 4,464,044 | 8/1984 | Matsuyama . |
| 4,478,509 | 10/1984 | Daughton et al. . |
| 4,517,468 | 5/1985 | Kemper et al. . |
| 4,524,371 | 6/1985 | Sheridon et al. . |
| 4,536,079 | 8/1985 | Lippolis et al. . |
| 4,538,163 | 8/1985 | Sheridon . |
| 4,584,592 | 4/1986 | Tuan et al. . |
| 4,591,983 | 5/1986 | Bennett et al. . |
| 4,639,918 | 1/1987 | Linkowski . |
| 4,642,782 | 2/1987 | Kemper et al. . |
| 4,644,373 | 2/1987 | Sheridan et al. . |
| 4,644,479 | 2/1987 | Kemper et al. . |
| 4,646,163 | 2/1987 | Tuan et al. . |
| 4,647,981 | 3/1987 | Froelich . |
| 4,648,044 | 3/1987 | Hardy et al. . |
| 4,649,515 | 3/1987 | Thompson et al. . |
| 4,658,370 | 4/1987 | Erman et al. . |
| 4,697,243 | 9/1987 | Moore et al. . |

(List continued on next page.)

FOREIGN PATENT DOCUMENTS

| | | |
|---|---|---|
| 0259144 | 3/1988 | European Pat. Off. . |
| 0366399 | 5/1990 | European Pat. Off. . |
| 92/20184 | 11/1992 | WIPO . |

OTHER PUBLICATIONS

Yonda; "Artificial Intelligence Reaching PCs"; Democrat and Chronicle, Rochester, N.Y., Apr. 18, 1988, p. 13D.

Liu et al.; "A Layered Intelligence Architecture for Programmable Controller Configurations"; Engineering Society of Detroit, Jun. 1987, pp. 77–83.

Pang; "An Expert System for CAD of Multivariable Control Systems Using a Systematic Design Approach"; American Control Conference; Jun. 1987; pp. 555–560.

Linden; "Putting Knowledge to Work"; Time; Mar. 28, 1988; pp. 60–63.

*Primary Examiner*—Ellis B. Ramirez
*Assistant Examiner*—Thomas Peeso
*Attorney, Agent, or Firm*—Oliff & Berridge

[57] ABSTRACT

An interactive user support system for a document processing system or an image producing device controls the operation of the machine using an internally stored knowledge base derived from information and rules provided by expels in the field. A plurality of sensors monitor the operation of the machine and a variety of user actions. If the system determines that the user needs help, by comparing the operation of the machine with the information and rules in the knowledge base, the system will interrupt the user and offer or provide assistance. If the user is performing proper steps to correct a problem or perform a specific job, the system will not interrupt the user. Additionally, the user may query the system for assistance or direction. The result is a more efficient document processing system or image producing device for use in any environment and able to be operated by a variety of users having a range of needs and abilities.

18 Claims, 3 Drawing Sheets

U.S. PATENT DOCUMENTS

| | | |
|---|---|---|
| 4,724,330 | 2/1988 | Tuhro . |
| 4,737,805 | 4/1988 | Weisfield et al. . |
| 4,739,366 | 4/1988 | Braswell et al. . |
| 4,740,886 | 4/1988 | Tanifuji et al. . |
| 4,839,822 | 1/1989 | Dormond et al. . |
| 4,864,415 | 9/1989 | Beikirch et al. . |
| 4,868,755 | 9/1989 | McNulty et al. . |
| 4,903,079 | 2/1990 | MacAndrew . |
| 4,931,950 | 6/1990 | Isle et al. ................................ 395/12 |
| 5,008,810 | 4/1991 | Kessel et al. ......................... 395/149 |
| 5,095,342 | 3/1992 | Farrell et al. . |
| 5,095,369 | 3/1992 | Ortiz et al. . |
| 5,103,498 | 4/1992 | Lanier et al. ........................... 395/12 |
| 5,124,908 | 6/1992 | Broadbent .............................. 395/147 |
| 5,138,377 | 8/1992 | Smith et al. ........................... 355/207 |
| 5,201,034 | 4/1993 | Matsuura et al. ..................... 395/161 |
| 5,202,726 | 4/1993 | McCulley et al. ..................... 355/207 |

INTERACTIVE USER SUPPORT SYSTEM AND METHOD USING SENSORS AND MACHINE KNOWLEDGE

This is a continuation of application No. 08/076,673 filed Jun. 15, 1993, now abandoned.

FIELD OF THE INVENTION

The present invention relates to machines and machine control using Artificial Intelligence (AI), and in particular to document processing and image producing machines, such as, for example, reproduction machines, fax machines and printers for producing copies of images, or images based upon electronic data streams, having an on-board expert system for tailoring operation of the document processing or image producing machine to closely match a user's needs and abilities.

BACKGROUND OF THE INVENTION

Artificial Intelligence (AI) is a branch of science resulting from the marriage of the cognitive and computer sciences. Computers, originally used for the manipulation of numbers (data), are now being used for the manipulation of ideas (knowledge). Trends and solutions can be inferred by the assimilation of observed or sensed facts just as numbers are added and subtracted to produce totals. Computer systems have been developed that exhibit functions very similar to some of the thought processes previously ascribed only to humans.

The study of AI leads to insight regarding the human thought processes in addition to the development of practical systems to solve problems in the workplace, the school and the home. The "expert system" is one utilization of AI technology for obtaining practical results. An expert system solves problems through the manipulation of knowledge. The expert system is an inference engine with a knowledge base upon which it operates. The knowledge base is compiled from both information about the target system and the experience of human experts in the field which is encoded in a computer language suited for the description and manipulation of ideas and principles.

The inference engine has, in recent years, become a widely available product through a number of companies, including Gold Hill Computers, Inc., of Cambridge, Mass.; Intellicorp, of Mountain View, Calif.; Technology Applications, Inc., of Jacksonville, Fla.; Teknowledge, Inc., of Palo Alto, Calif.; Neuron Data, Inc., of Palo Alto, Calif.; and Texas Instruments, of Austin, Tex. Two inference engines have been disclosed in U.S. Pat. Nos. 4,658,370 to Erman et al., and 4,648,044 to Hardy et al., both assigned to Teknowledge, Inc.

Expert systems recently have found use in a variety of applications, such as in agriculture, chemistry, computer design, construction, engineering, finance, management, health care, manufacturing, and others. For example, in U.S. Pat. No. 4,591,983 to Bennett et al., an expert system for use in inventory control is disclosed, and U.S. Pat. Nos. 4,517,468, 4,642,782, and 4,644,479, all to Kemper et al., each disclose a diagnostic system for monitoring an industrial system, such as a steam turbine generator power plant.

A current focus in the market place is on "intelligent machines". These machines are or appear to be "intelligent" in the way that they operate; i.e., they monitor their own performance and adapt to changing conditions. These machines are also perceived to be "intelligent" by their users due to the ability of the machine to "understand" and satisfy the objectives of the user. Additionally, these machines appear to be highly reliable since they tend to minimize unscheduled maintenance and machine shutdowns. This conveys another perception of intelligence.

Most expert systems communicate via computer text with the user and provide data or instructions in response to user inquiry. These systems are burdensome on the user because the user must deal with the computer interface to the expert system as well as the original problem. The system can become an imposing burden on a novice or a knowledgeable user. There are several aspects to this problem. Typically, the expert system is separate from the device/machine with which it is associated. This means that the user must stop working on the "real" task and begin operating the expert system in order to obtain information. This is further complicated when the interface to the expert system is the same set of controls and displays (CID's) that the operator must use to operate the device/machine itself. Thus, the user is faced with two tasks (operating the machine and operating the expert system) and the additional complexity of a shared interface. Often, a third task is required—that of gathering information about machine status/operation and supplying this to the expert system by means of the user interface (UI) or C/D system.

There is also the potential for a mismatch between the design/complexity of the expert system or UI and the experience or ability of the current user. Whereas a novice will need detailed, step-by-step instructions, a frequent user will become impatient with unneeded detail. Conversely, a novice would not understand complex, high-level information directed at an experienced user.

Batchelor U.S. Pat. No. 4,186,299, assigned to Xerox Corporation, and Matsuyama U.S. Pat. No. 4,464,044 disclose copying machines having keypads primarily for directing normal copying operations. The keypads and associated logic also serve the additional function of initiating diagnostic routines.

Lippolis et al. U.S. Pat. No. 4,536,079 discloses a copying machine keyboard that is usable by a service agent to change a timing parameter for diagnostic and repair purposes.

Daughton et al. U.S. Pat. No. 4,478,509, assigned to Xerox Corporation, discloses a control console which can be used to direct copy or other runs. See column 18, line 60.

Linkowski U.S. Pat. No. 4,639,918 discloses a calculator keyboard that is used to control diagnostic functions of a mailing machine. During regular operation, the same key pad is used to control the normal functioning of the machine.

U.S. Pat. Nos. 4,642,782 to Kemper et al., 4,644,479 to Kemper et al., 4,649,515 to Thompson et al. and 4,697,243 to Moore et al. (all assigned to Westinghouse Electric Corp.) disclose apparatuses which employ expert systems to perform a diagnostic function. U.S. Pat. No. 4,642,782 discloses a computer controlled diagnostic apparatus for industrial or other types of operating systems. A rule base pertinent to the particular operating system being diagnosed is stored in memory. The rule base is established by an expert (or experts) in the field to which the diagnosis pertains. Sensors monitor operating parameters of the system and provide output signals which are fed to the diagnostic apparatus. Indications of the overall "health" of the operating system in general and of its components in particular are provided to the user via a display. Thompson et al. U.S. Pat. No. 4,649,515 discloses a system for developing a generic facility for the construction of a knowledge-based system. The system is usable in interactive modes for aiding service personnel in diagnosing system malfunctions. Kemper et al. U.S. Pat. No. 4,644,479 discloses a diagnostic apparatus which utilizes a diagnostic expert system to monitor a steam turbine-generator power plant. Moore et al. U.S. Pat. No. 4,697,243 discloses a method of using an expert system wherein an expert system having a knowledge base of elevator troubleshooting information is used interactively by remotely located elevator service personnel in order to diagnose malfunction. The expert systems disclosed in the above patents perform diagnostic functions, but do not provide self-corrective functions or corrective advice.

U.S. Pat. No. 4,739,366 to Braswell et al. (Xerox Corp.) discloses a reproduction machine which stores information regarding previous operation of the machine in a memory for subsequent retrieval and analysis on the occurrence of a malfunction.

Dormond et al. U.S. Pat. No. 4,839,822 discloses an expert system for suggesting treatments for traumas. Gangarosa et al. U.S. Pat. No. 4,835,690 discloses an integrated expert system for medical imaging scan, set up, and scheduling. A first expert system obtains index constraint and priority values while a second expert system optimizes these values.

Tanifuji et al. U.S. Pat. No. 4,740,886 discloses a computer control system for controlling a plant which utilizes knowledge engineering to select a mathematical formula model to control the plant.

McNulty et al. U.S. Pat. No. 4,868,755 discloses an automatic control system for an aircraft which has a first controller connected to the pilot's operating controls. The first controller manipulates the operating controls so that goals, expressed in terms of selected aircraft parameters, are achieved. A second controller supplies a series of goals to the first controller so that the aircraft will perform desired maneuvers. A third controller acts as a mission planner, and supplies desired maneuvers to the second controller in accordance with overall mission plans. The third controller is an expert system having a field of expertise relating to flight planning and control.

Smith et al. U.S. Pat. No. 5,138,377 discloses an internal expert system to aid in servicing which monitors predetermined status conditions of the machine for automatic correction or for communication to the user.

An article entitled "Artificial Intelligence Reaching PCs", Democrat and Chronicle, Rochester, N.Y., Apr. 18, 1988, discloses the use of AI technology with personal computers.

The Mar. 28, 1988 edition of TIME Magazine discloses on page 61, the use of expert systems like RIC (Remote Interactive Communications) by Xerox in copiers. According to this article, by employing the reasoning of a special Xerox team of diagnosticians, RIC reads data from a copier's internal instruments, senses when something is about to go wrong, and sends a report to a repairman, who can warn the customer that an imminent breakdown can be avoided by taking appropriate steps. The described RIC system, however, is located external to the machine, and is only diagnostic, not self-corrective.

There is also a system closely associated with RIC which the Xerox Technical Representative can utilize on site to help repair the machine. The Technical Representative carries a small computer which can be connected by phone (or radio) to a larger computer in a central office. The large, central computer has in its memory an expert system and knowledge base for the broken machine. The Technical Representative performs tests and replies to questions from the central computer at the direction of the expert system. After several communications in each direction, the expert system determines the cause of the malfunction and instructs the Technical Representative in the proper method of correction.

A paper entitled "A Layered Intelligence Architecture for Programmable Controller Configurations" by P. Liu, C. N. Lee and Ming-Lee Chiu, Engineering Society of Detroit, June 1987, pp. 77–83, discloses a knowledge-based system structure for configuring control systems for specific applications.

Expert systems and control are discussed in the "Proceedings of the 1987 American Control Conference", published June 1987.

All patents and publications cited in this specification are herein incorporated by reference.

OBJECTS AND SUMMARY OF THE INVENTION

It is an object of the present invention to provide an interactive user support system and method of using sensors and machine knowledge which monitors user input and interacts with the user when the system detects that the user needs assistance or when the user requests assistance.

It is another object of the present invention to provide a machine that is intelligent in that it can interact with a user thereof so as to better understand the objectives or requirements of the user and then adapt its operation so as to best meet those objectives or requirements without burdening the user with additional tasks or interactions.

To achieve the foregoing and other objects, and to overcome the shortcomings discussed above, an expert system for a document processor or an image producing machine having a plurality of subsystems and components that perform various functions is provided. The expert system is embedded in the document processor or image producing machine itself. The system gathers information by "watching" machine sensors which respond to machine operation, user actions or the results of user actions.

The system is used to control, for example, an image producing machine such as a reproduction machine, fax machine or a printer, or any peripheral devices for these products such as, for example, document handlers or finishing devices. The expert system then "watches" machine operation and the results of user actions to determine if the machine is working correctly and if the user is operating the machine properly. For example, a machine sensor located near the finishing device would notice the output of an unwanted blank page. Although, through the database and information from other sensors, the preprogrammed control center may recognize a problem and know how to correct it, the expert system will not necessarily interrupt the user. Instead, the system will "watch" the user to determine whether the user is taking the proper corrective action. If the system recognizes user error or confusion, it will interrupt and explain possible steps to correct the problem. Alternatively, the expert system could ask if the user needs help or immediately inform the user that a possible error exists and that information is available to correct it.

A multitude of sensors are provided throughout the image producing device to monitor user operations. For example, a visible light or infrared sensor can be provided so as to determine the location of the user, and instructions can be provided to the user, if necessary, to direct the user to the correct portion of the printing device. For example, if a finishing device must be cleared before operation can continue and the user fails to move to the vicinity of the finishing device or goes to an incorrect area of the machine, the system could instruct the user to move to the finishing device and/or inform the user of the location of the finishing device. Additionally, sensors can be provided (or existing sensors can be utilized) to monitor the progress of the user in performing various tasks. For example, by using available jam sensors, during a jam clearance procedure, if originals must be cleared from the document feeder, the system will monitor what the operator does to correct the problem. If the operator fails to perform the correct/necessary steps or addresses areas that are not necessary, the expert system will offer or provide instructions to help the user complete the task correctly.

An expert system would provide more direct and specific feedback during a toner loading task than is done presently. Currently, it is common practice to monitor the concentration of toner and to stop the machine and provide a message informing the operator to load toner. A label enumerates the correct steps and task completion is sensed indirectly by the opening and closing of an access door. An interactive user support system would monitor most or all possible operator actions and redirect the operator if any task is performed other than one that helps accomplish correct toner loading. As each step is accomplished, monitoring continues, and the operator is directed to perform additional steps until all steps are accomplished correctly. Finally, the system provides acknowledgement that the task has been accomplished correctly.

The expert system assumes that the user is both knowledgeable and capable, and provides no help or instruction as long as operation is normal and successful. The user can request help either before, during or after a task is to be performed. The system offers help if the user's actions are such that the system suspects that the user is making an error or if the user attempts to continue a job without completing predetermined steps. The system can store user actions and compare them with an existing list of required actions, regardless of order, to determine steps to be accomplished. The system will notice user actions that are not required and redirect the user back to the set of appropriate actions. As a result, the system tailors its operation to closely match the user's needs according to whether the user is a novice or an expert. The effect is a system whose parameters are different under various circumstances and for a variety of users.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Although the invention is illustrated as it would be employed in one type of reproduction machine, it is understood that the present invention is applicable to other types of reproduction machines (e.g., reproduction machines which employ ionographics or image scanners), as well as to other types of document processors and printing machines. A system particularly suitable for the present invention is the Docutech system by Xerox Corporation described in U.S. Pat. No. 5,095,342 and U.S. Pat. No. 5,095,369 the disclosures of which are herein incorporated by reference. Additionally, the present invention is usable with printers which receive electronic data streams from, for example, computers to print images. Printers differ somewhat from reproduction machines in that while reproduction machines usually produce an image that is an exact copy of an original (although possibly having a different size and/or color), printers can produce images for the first time by, for example, changing the font in which characters are printed or by piecing together data from various sources to "create" an image. Printers produce a physical copy (where the image is directly viewable/readable to the user) from an "original" that exists as electronic data. Machines that incorporate copying, scanning and printing functions are particularly suited for the expert system of the present invention. Accordingly, the term "image producing device" as used herein is meant to encompass both reproduction machines (copiers) and printers, as well as any other type of machine which forms images on a recording medium such as, for example, magnetic tape, optical memory or paper. Additionally, the present invention is applicable to individual modules used with or as part of an image producing machine such as, for example, document handlers and finishing devices.

Figure 1:
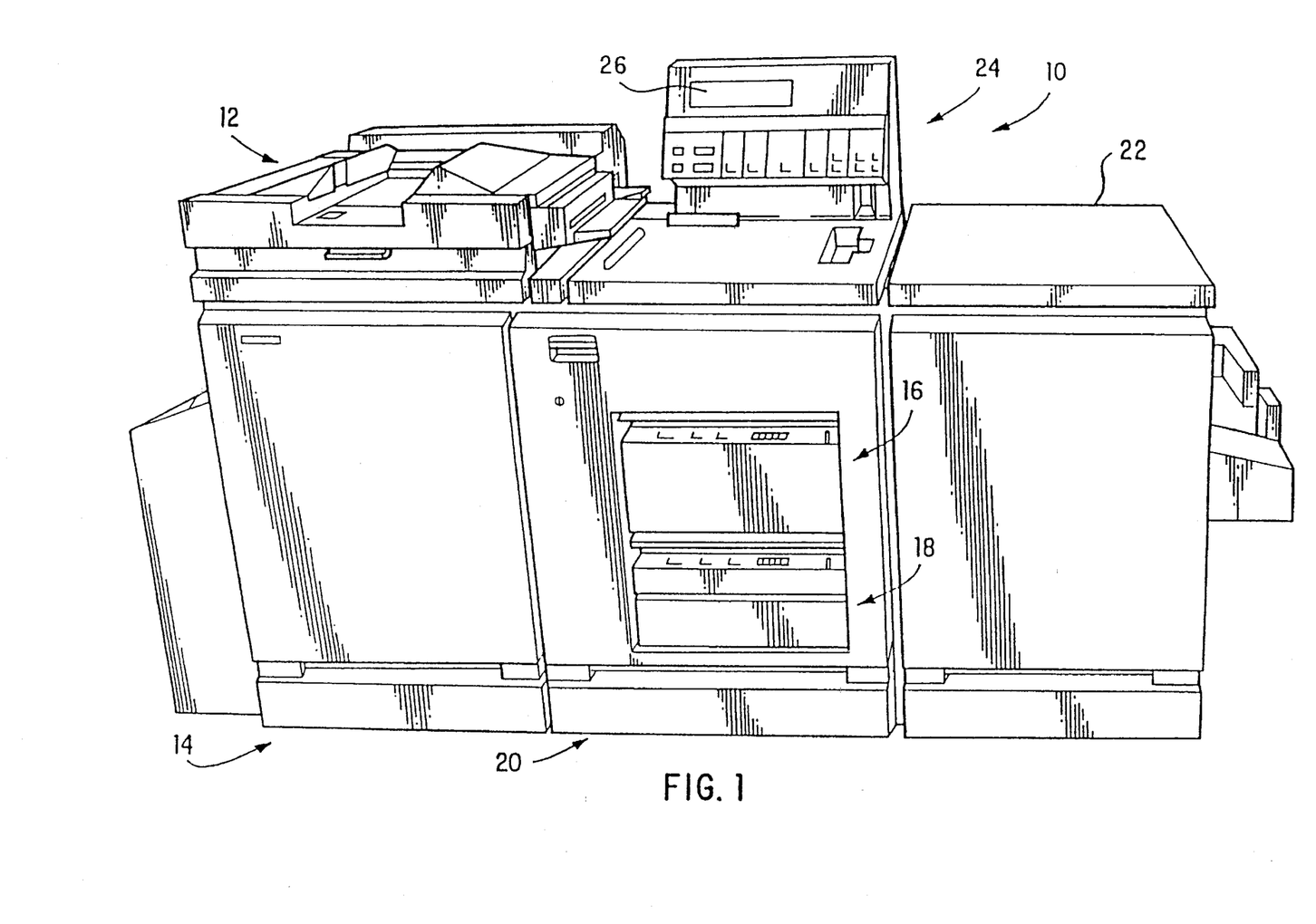
FIG. 1 is a perspective view of a reproduction machine of the type contemplated for use with the present invention.

Referring now to the drawings, wherein the showings are for the purpose of illustrating a preferred embodiment of the invention and not for the purpose of limiting the same, FIG. 1 shows a perspective view of a reproduction machine as contemplated by the present invention. Reproduction machine 10 may include document handler 12, for advancing documents to be copied to the appropriate position on the transparent platen 42, in processing module, where the imaging processes are performed. Copy paper stock is advanced from copy sheet holding trays 16 and 18 through the copy sheet module 20 to the processing module 14 for operation thereon. The resultant copies may then be transported to a finishing module 22 where such steps as, for example, collation, compilation, stapling, or binding may take place. Control panel 24, with display screen 26, allows the machine user to select the various options available in the device, to start and stop copying operations and to otherwise program the machine operation by the input of, for example, data and objectives. Display screen 26, in conjunction with control panel 24, allows the user to interact with the system and to view the selected machine conditions as well as certain control aspects of the device and information about machine status and operation. In addition, an audio terminal 26' can be provided for audio communication with the system. Audio terminal 26' is connected through a known voice recognition device.

Figure 2:
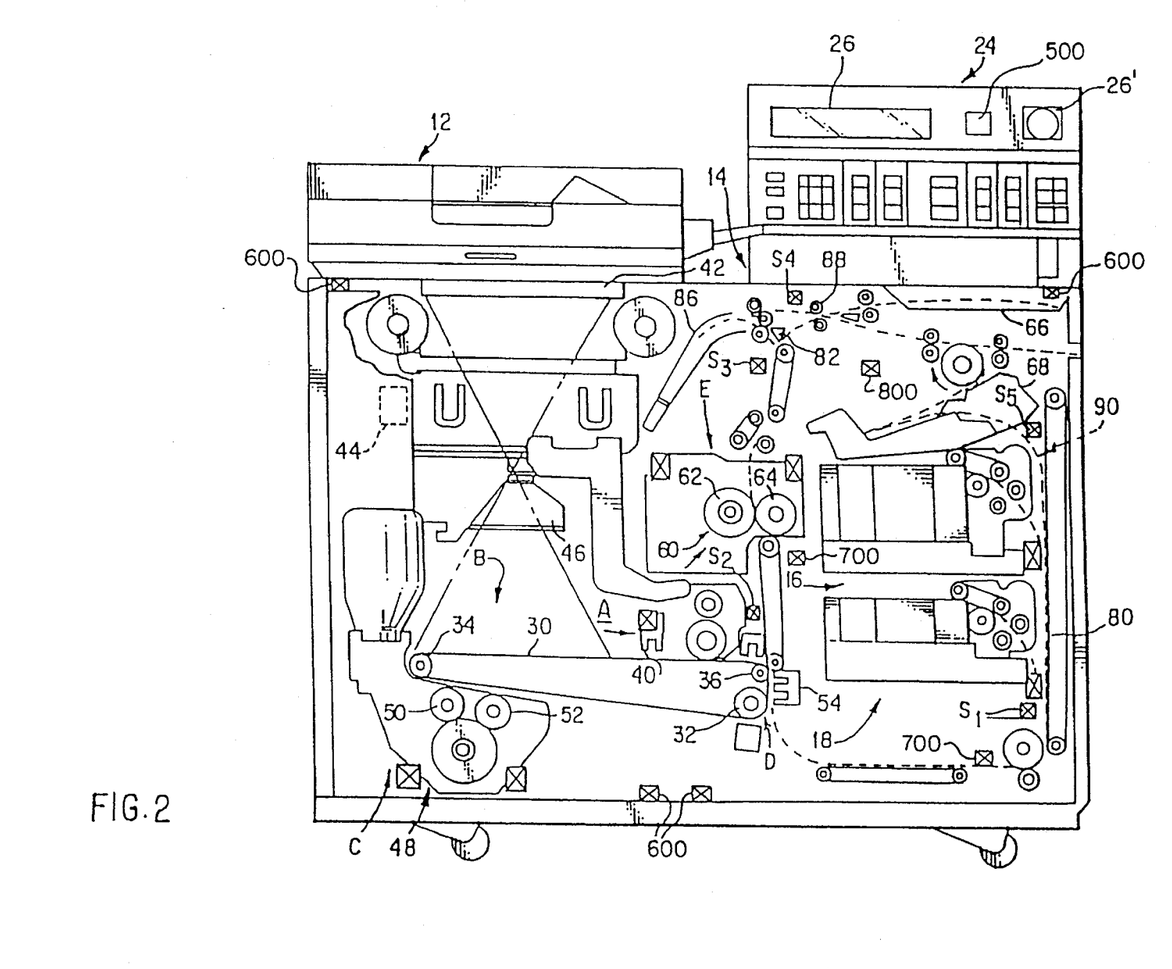
FIG. 2 is a somewhat schematic view of a paper path in accordance with a reproduction machine usable with the present invention.

FIG. 2 shows, somewhat schematically, the general operating arrangement of a reproduction machine of the type contemplated. Module 14 is provided with belt 30 having a photoconductive surface deposited on a conductive substrate. Belt 30 is advanced by and about driving roller 32, tensioning roller 34 and stripping roller 36. Successive portions of the photoconductive belt 30 are thereby advanced through processing stations sequentially arranged about the path of belt 30.

To begin the copying process, a portion of belt 30 passes through charging station A, where a corona generating device (or coronode) 40 charges the surface of belt 30 to a relatively high uniform potential.

After the surface of belt 30 is charged, the charged portion thereof is moved to exposure station B. When the charged portion of belt 30 is positioned at station B, a document to be copied is advanced onto a transparent platen 42 by the document handling system 12 (which can include, for example, a recirculating document handler). Lamps 44 illuminate the document. Light rays reflected from the illuminated document are transmitted through lens 46 forming a light image thereof. The lens 46 focuses the light image on the photoconductive surface of the belt 30 to selectively dissipate the charge thereon. An electrostatic latent image is recorded on the photoconductive surface which corresponds to the informational areas contained within the original document.

After the electrostatic image is recorded on the photoconductive surface of belt 30, that portion of the belt holding the image is advanced through development station C. At development station C, magnetic brush development system 48 advances developer material into contact with the latent image on belt 30. For example, magnetic brush development system 48 may include magnetic brush development rollers 50 and 52. Each roller advances developer material into contact with the latent image. Rollers 50, 52 form a brush of carrier granules and toner particles extending outwardly therefrom. The latent image attracts the toner, forming a toner powder image on the latent image.

After development, the image carrying portion of belt 30 advances to transfer station D. A copy sheet, such as paper, transparency, etc., is advanced from the copy sheet module 20. Transfer station D includes a corona generating device (or coronode) 54 which sprays ions onto the backside of the copy sheet, which then attracts the toner particles from the photoconductive surface of belt 30. After transfer of the toner material to the copy sheet, the copy sheet is moved to fuser station E.

Fuser station E includes a fuser assembly 60 for permanently affixing the transferred toner powder onto the copy sheet. Fuser assembly 60 comprises a heated fuser roller 62 and backup roller 64. The copy sheet is passed between fuser roller 62 and backup roller 64 with the toner powder image on the copy sheet contacting the fuser roller. In this manner, the toner powder image is permanently affixed to the copy sheet. After fusing, the copy sheet is advanced to either an output tray 66, the finishing module 22, or a duplex tray 68 where additional operations may be performed thereon. Reproduction copying in the manner described above is well known, and does not by itself form a part of the present invention.

Although the illustrated embodiment reflects light directly off of a document and onto photoconductive belt 30, it is understood that the present invention can also be used in reproduction machines which use other arrangements for imaging a document (i.e., forming a latent image of an original document on a photoreceptor). For example, raster input scanning devices can be used to scan an image-containing surface of a document, to produce an electronic data signal representative of the image contained on the document. This data signal can then be used to control (or imagewise modulate) a laser beam which directs a beam of light towards a photoconductive belt to form a latent image thereon. For some examples of reproduction machines using the above-described type of scanner and/or laser printer, see U.S. Pat. Nos. 4,724,330 to Tuhro, 4,149,091, 4,864,415 to Beikirch et al., 4,903,079 to MacAndrew, and 4,647,981 to Froelich, the disclosures of which are herein incorporated by reference.

Alternatively, a data signal can be used to modulate a stream of ions directed towards an electroreceptive surface (e.g. a belt or drum) to form a latent image thereon. For examples of reproduction machines using ion streams to form latent images on an electroreceptive belt, see U.S. Pat. Nos. 4,584,592 to Tuan et al., 4,646,163 to Tuan et al., 4,524,371 to Sheridon et al., 4,463,363 to Gundlach et al., 4,538,163 to Sheridon, 4,644,373 to Sheridan et al., and 4,737,805 to Weisfield et al., the disclosures of which are herein incorporated by reference. Accordingly, the term "page image" used in this disclosure refers to either an actual printed image on a page or the electronic signal representative of an actual printed image (which electronic signal can be scanned from a document and immediately used to form a latent image on a belt, or stored in memory such as, for example, a floppy disk, and used later to form a latent image on a belt). Additionally, the image can be sent from, for example, a computer with either a full page image or in combination with instructions for the composition of the page.

In accordance with the invention, photoelectric, mechanical or pressure sensitive sensors may be arranged at predetermined locations within the machine, such as along the document handler paper path including finishing devices or the copy sheet transport devices, or along the path of the photoconductive belt. By way of example, photoelectric sensors $S_1, S_2, S_3, S_4, \ldots, S_N$ may be, located along the paper path of the copy sheet transport devices at locations proximate to copy sheet tray conveyor 80 carrying copy sheets outwardly from copy sheet trays 16 and 18, at the conveyor carrying copy sheets to fuser 60, at the selector gate 82, passing the paper to either of inverter 86, or to output 66, at the output tray nip 88 or at duplex tray output 90. It will be appreciated that many more sensors of various types may be used in a wide variety of locations, either in the reproduction or image printing module 14 or in any of the other modules.

Although the above example relates primarily to the location (or absence of) sheets in the paper path, there are, as well, other circumstances or conditions where a sensor or sensors could provide useful information. Some examples of these are:

An acoustic or infrared sensor (500) which would help determine where the operator is standing relative to the machine.

An opto-mechanical sensor (600) to determine whether a door or cover is open.

An acoustic sensor (700) to help compare the sound of the machine as it operates with a known acoustic signature of the machine in a non-fault or one of several fault conditions.

A temperature or humidity sensor (800).

In addition, all the normal machine controls can act as sensors in this capacity in that they sense operator actions/intentions.

The number and type of sensors utilized depends upon the cost and complexity which is desired in the machine. As examples, the following generic parameters can be sensed:

(1) paper in the finishing device;

(2) paper in the document feeder;

(3) open/closed machine doors;

(4) toner level/concentration;

(5) sound of machine operation;

(6) operator location;

(7) paper tray status;

(8) open/closed internal covers;

(9) etc.

The locations of the above and additional sensors depend on the machine, the subsystems and components being monitored and controlled, and would be apparent to one of ordinary skill in the art based upon the provided description.

Figure 3:
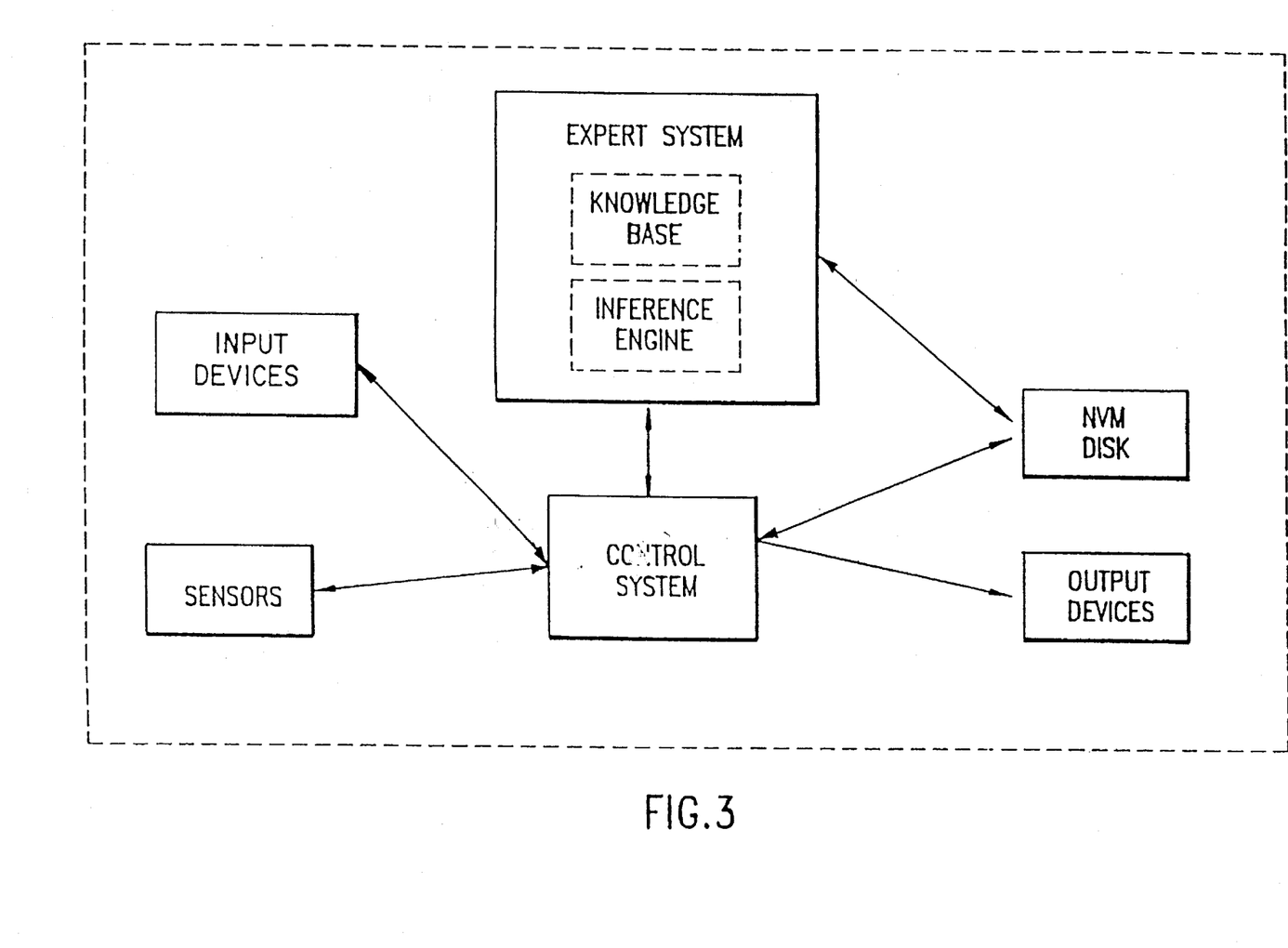
FIG. 3 is a block diagram showing the operational elements of an embodiment of the present invention.

FIG. 3 is a block diagram illustrating the components and general interrelation of the components of the system according to the present invention. The knowledge base consists of rules based on heuristic knowledge, derived from, for example, design engineers, field technicians, user interface designers, and others, that would enable the machine to cope with numerous types of sensed operations. Information in the knowledge base includes correlations between user actions and desired results and undesirable results. The knowledge base includes information about failure modes, operation modes and specific hardware operations. Some failure modes include paper jams, low toner, door open at the wrong time, out of paper, and paper misfeeds.

The operation mode information includes information in connection with the output of the image producing device. Examples of such information include sensing output of blank pages and potential causes and their solutions, problems that cause and potential solutions for dark and/or blurry output, problems and potential solutions with finishing operations, etc. The hardware operation information includes problems with the actual hardware of the image producing device and information and instruction on replacement parts.

The knowledge base also includes information that enables interactive dialogue with the user so that the system can determine what the user is trying to accomplish and the necessary steps required to perform the task. The knowledge-based controller system, armed with the knowledge of the overall machine as part of its knowledge base, continuously monitors the machine's behavior to detect any undesired behavior and determines appropriate corrective actions by comparing the operation with the knowledge base.

The information and rules of the knowledge base are stored in a CD-ROM or other mass memory device in the system. The system watches the user's actions through the sensors and determines whether the user is performing a reasonable operation or taking the proper corrective actions. The system will only interrupt the user if it detects a difference between the operation of the image producing device and the information and rules stored in the system. The display screen 26 (and/or another communication device such as a loudspeaker) communicates with the CD-ROM and is operated by the control system for communication with the user. The display screen is capable of displaying information stored in the CD-ROM in combination with a network system or other internal CPU.

When the system determines that it may be appropriate to communicate with the operator, a further check is made to determine whether now (the present moment) is the appropriate time to interrupt. For instance, the operator may have completed the first step of a jam recovery procedure. He may start doing step 3 rather than step 2. Rather than interrupt the process and direct him to do step 2 instead, the system would provide helpful assistance with step 3 and then direct the operator back to step 2 after step 3 is accomplished. The operator can continue with other steps until the last step where he tries to restart the machine. If step 2 has still not been completed, only then will the system interrupt the process and inform the operator that step 2 is a required task and has been omitted and tell the operator how to accomplish it. An alternate scenario is that the operator realizes that a step has been omitted before he restarts the machine, in which case, the system would inform him of the status of the task and the steps necessary to complete it.

The architecture of the knowledge-based control system also facilitates easy changes to its knowledge base, thereby enabling improved machine performance. This knowledge-based approach can permit customization of each machine according to specific customer requirements. For example, the system can be adapted to communicate in different languages depending on the needs of its users. In a geographic area where more than one language is spoken (such as Switzerland or Canada), communication can be provided in whatever language the operator prefers. These languages may be co-resident in the storage media such as a CD-ROM or alternate CD-ROMs may be provided depending on the requirements of a specific installation. Another way the system may be customized is by application rather than language. The dialog between the machine and the operator may be at different levels of complexity. A sheltered workshop may need a simplified dialog and feature set while a reproduction service with multiple, trained operators may be more efficient with a high level, abbreviated version of the dialog and an expanded feature set. In the same way, the dialog and feature set may be set up differently for a printshop, a walkup copier, a law firm, an aerospace company, or a real estate firm, etc.

In operation, a user is presented with a menu including, for example, general headings such as Sales, System, Job Aids, User Help and Tech Rep. Each heading provides access to various information in the knowledge base.

Under the Sales heading, the user can view a sales presentation for the machine stored in the knowledge base. The expert system receives signals from the CD-ROM and an internal CPU. As a result, the system operates the machine while displaying the information on the display screen 26. The knowledge base can also include information on other copiers or products.

Under the System heading, the user can view a factory performed description of the product as well as various walk-up features of the system. Many other functions will be contemplated by those skilled in the art that fall within the scope of this invention.

Under the Job Aids heading, the user can be given step-by-step instructions to perform specific jobs. For example, the system can instruct the user how to prepare various finishing functions such as covers. In addition, the knowledge base can include instructions for copying colored paper or graph paper. Alternatively, a sensor $S_N$ near an output tray can detect the output of a dark, blurred copy. The knowledge base knows, for example, that this can be the result of copying thin colored paper (such as colored phone book pages). At this instance, the system will suggest to the user to place a dark piece of paper behind the sheet being copied and to lower the darkness value of the copies. The system can even operate the machine to output a piece of dark paper.

User Help includes toner loading, paper loading, repeated jams, corotron problems, etc. The knowledge base includes specific instructions for performing each of the above-described operations. The expert system uses sensors within the machine to determine whether the instructed step has been carried out. After each user action, the system will provide the next instruction. For example, when toner is low, the user will be instructed to open an access door. After the user has opened the access door, the user will then be instructed how to remove the used toner container. After removing the used toner container, the user interface will display how to insert the new toner container. After each step is performed, the system either provides additional instruction or corrects any erroneous action by the user. Still further, if a problem is unknown, the system can guide the user through a series of questions to determine possible solutions. The knowledge base includes information which enables the system to determine the problem and explain possible solutions.

The Tech Rep heading provides access to information regarding, for example, photoreceptor replacement, document handler parts, toner problems caused by a broken seal, toner patch readings, finisher installation, finisher staple operation, etc. This information can enable ordinary users to perform more complex operations such as photoreceptor replacement. For example, the knowledge base includes information regarding what tools and parts are necessary to perform the replacement, in addition to the step-by-step instruction.

The user may also initiate an interactive dialogue with the system to access particular information. For example, assume the user desires information concerning a feed roller. The display screen will display a picture of the image producing device. The user can then interact with the system through the display screen, such as by touching the part of the image producing device shown on the display screen where the feed roller is located. The system will continue to enlarge the view of the image producing device on the display screen until the feed roller is exposed. The user can then touch the feed roller to initiate the instruction. The knowledge base includes detailed information about the part including part number and step-by-step instruction as to its installation or replacement.

While the present invention is described with reference to preferred embodiments thereof, the description is intended to be illustrative, not limiting. Various modifications may be made without departing from the spirit and scope of the invention as defined in the appended claims.

What is claimed is:

1. An interactive user support system for an image producing device, comprising:

storage means for storing information and rules relating to operation of the image producing device;

sensing means for sensing the operation of the image producing device as a result of user actions, said sensing means providing signals representative of a deviation between user expectations and the operation of the image producing device;

user interface means for enabling an interactive dialogue between said system and said user;

comparing means for comparing the operation performed by a user on said image producing device based on said signals from said sensing means with said information and rules stored in said storage means;

means for determining whether it is appropriate to communicate with said user in accordance with the comparison from said comparing means; and controlling means for controlling output of the user interface means only if said determining means determines that it is appropriate to communicate with said user.

2. The interactive user support system of claim 1, wherein said sensing means comprises a plurality of sensors disposed at specific locations in the image producing device.

3. The interactive user support system of claim 1, wherein said controlling means prevents operation of the image producing device if said comparing means determines a difference between a series of actions performed by said user and said information and rules stored in said storage means.

4. The interactive user support system of claim 1, wherein said user interface means communicates with said user via a video monitor.

5. The interactive user support system of claim 4, wherein said user interface means communicates with said user via an audio terminal.

6. The interactive user support system of claim 1, wherein said user interface means communicates with said user via an audio terminal.

7. The interactive user support system of claim 6, wherein said controlling means provides assistance to the user via said user interface means if said comparing means detects a difference between a series of actions performed by said user and said information and rules stored in said storage means.

8. The interactive user support system of claim 7, wherein said user interface means comprises means for initiating an interactive dialogue with said user.

9. A method of operating an image producing device using an interactive user support system, the method comprising the steps of:

storing information and rules relating to operation of the image producing device;

sensing the operation of the image producing device as a result of user actions;

providing signals in accordance with said sensing step representative of a deviation between user expectations and the operation of the image producing device;

enabling, with a user interface, an interactive dialogue between said system and said user;

comparing the operation performed by a user on said image producing device based on said signals from said providing step with said information and rules;

determining whether it is appropriate to communicate with said user in accordance with said comparing step; and controlling output of the user interface only if it is determined in said determining step that it is appropriate to communicate with said user.

10. The method of claim 9, wherein said controlling step includes the step of preventing operation of the image producing device if said comparing step determines a difference between a series of actions performed by said user and said information and rules stored in said storing step.

11. The method of claim 9, further comprising the step of providing assistance to said user via a user interface if said comparing step detects a difference between a series of actions performed by said user and said information and rules stored in said storing step.

12. The method of claim 11, further comprising the step of initiating an interactive dialogue between said system and said user.

13. An interactive user support system for an image producing device, comprising:

storage means for storing information and rules relating to operation of the image producing device;

sensing means for sensing the operation of the image producing device as a result of user action, said sensing means providing signals representative of a deviation between user expectations and the operation of the image producing device;

user interface means for enabling an interactive dialogue between said system and said user;

comparing means for comparing the operation performed by a user on said image producing device based on said signals from said sensing means with said information and rules stored in said storage means; and controlling means for controlling output of the user interface means if requested by said user or if said comparing means determines that said user performs an incorrect action, said incorrect action being an attempt of said user to complete an operation without first performing all of the steps of said operation without regard to the sequence of performance of said steps by said user.

14. The interactive user support system of claim 13, said controlling means further for monitoring certain conditions in accordance with said sensing means, said conditions being independent of the interaction of said user with said system, said controlling means prompting said user interface to display a message if at least one of said conditions becomes a predetermined condition.

15. An interactive user support system for an image producing device, comprising:

storage means for storing information and rules relating to operation of the image producing device;

sensing means for sensing the operation of the image producing device as a result of user action, said sensing means providing signals representative of a deviation between user expectations and the operation of the image producing device;

user interface means for enabling an interactive dialogue between said system and said user;

comparing means for comparing the operation performed by a user on said image producing device based on said signals from said sensing means with said information and rules stored in said storage means; and controlling means, said controlling means having a first mode and a second mode of operation, said first mode being a monitoring mode, said controlling means for monitoring said system and allowing said user to proceed even if said comparing means senses that said user performed an incorrect action, so long as said user corrects said incorrect action within one of a predetermined interval of time and a number of operations, said second mode being an assistance mode, said controlling means for assisting said user via said user interface means to correct said incorrect action by issuing instructions, wherein said control means remains in said monitoring mode and permits said user to perform the steps of a predetermined process out of sequence with respect to said information and rules stored in said storage means, so long as said user completes all of said steps of said predetermined process.

16. The interactive user support system of claim 15, said controlling means further for monitoring certain conditions in accordance with said sensing means, said conditions being independent of the interaction of said user with said system, said controlling means prompting said user interface to display a message if at least one of said conditions becomes a predetermined condition.

17. An interactive user support system for an image producing device, comprising:

storage means for storing information and rules relating to operation of the image producing device;

sensing means for sensing the operation of the image producing device as a result of user action, said sensing means providing signals representative of a deviation between user expectations and the operation of the image producing device;

user interface means for enabling an interactive dialogue between said system and said user;

comparing means for comparing the operation performed by a user on said image producing device based on said signals from said sensing means with said information and rules stored in said storage means; and controlling means for controlling output of the user interface means if requested by said user or if said comparing means determines that said user performs an incorrect action, wherein after said incorrect action has been determined, said controlling means begins assisting said user if said user fails to correct said incorrect action within one of a predetermined time limit and a number of operations.

18. The interactive user support system of claim 17, said controlling means further for monitoring certain conditions in accordance with said sensing means, said conditions being independent of the interaction of said user with said system, said controlling means prompting said user interface to display a message if at least one of said conditions becomes a predetermined condition.

* * * * *